United States Patent [19]

Hansen

[11] Patent Number: 4,549,639
[45] Date of Patent: Oct. 29, 1985

[54] CLUTCH CONTROL FOR A ROTATION AND RECIPROCATION TRANSMISSION

[76] Inventor: Quinten A. Hansen, 4338 Hwy. 38, Franksville, Wis. 53126

[21] Appl. No.: 577,183

[22] Filed: Feb. 6, 1984

[51] Int. Cl.[4] ............................................. F16D 21/02
[52] U.S. Cl. ................................ 192/48.91; 192/87.17
[58] Field of Search ................ 192/48.91, 53 E, 53 F, 192/87.17

[56] References Cited

U.S. PATENT DOCUMENTS 3,424,286  1/1969  Otterbach et al. ........... 192/48.91 X
4,098,380  7/1978  Thomas ........................ 192/48.91 X Primary Examiner—Stephen F. Husar
Attorney, Agent, or Firm—Arthur J. Hansmann

[57] ABSTRACT

A clutch control for a rotation and reciprocation transmission, such as that used in garment knitting machine. A shaft is alternately driven in a rotating and in a reciprocating mode, and there are two drive members flanking a clutch which shifts back and forth. A clutch shifter gate is utilized for synchronizing the engagement of the clutch with the drive members.

11 Claims, 6 Drawing Figures

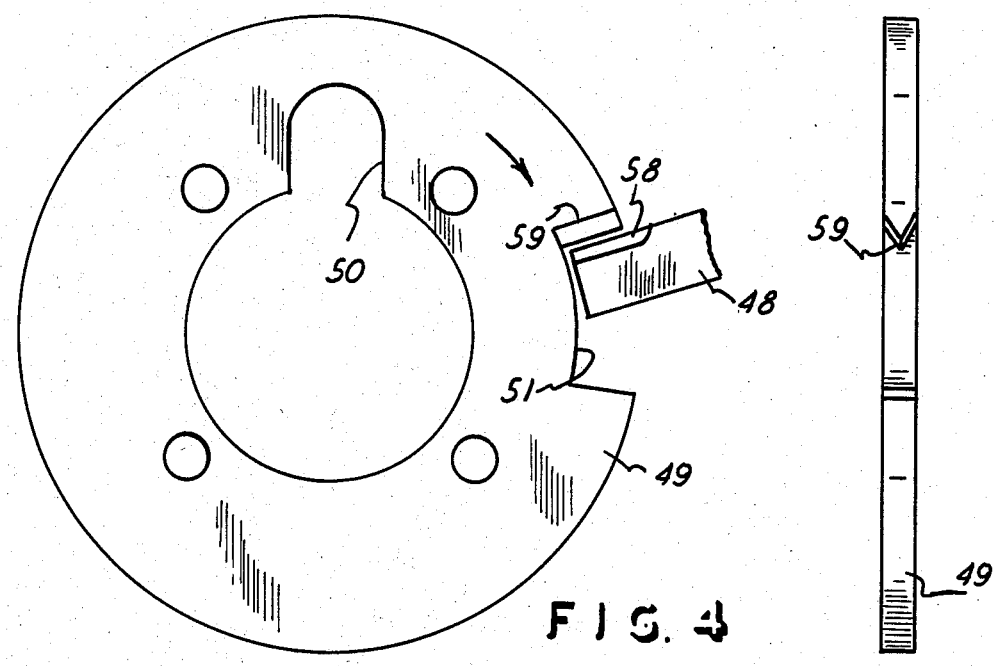
FIG. 4
FIG. 5
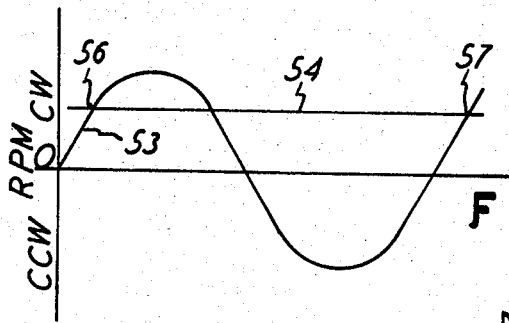
FIG. 6
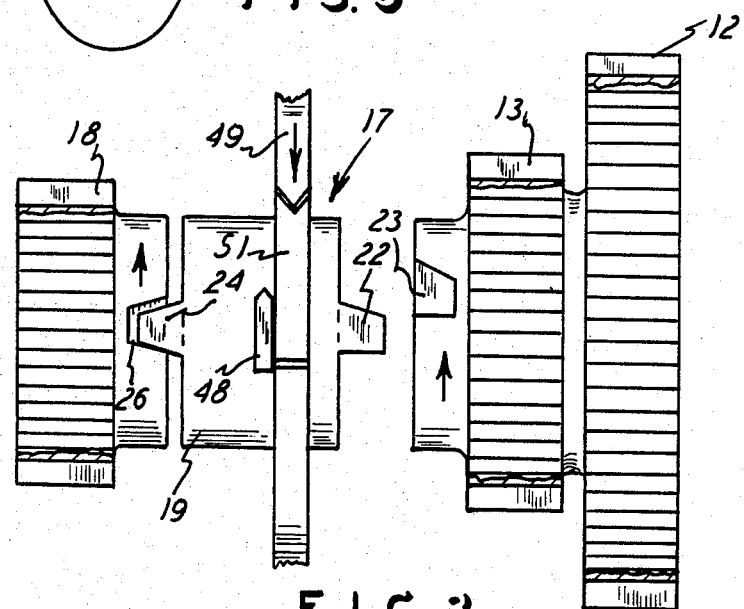
FIG. 3

CLUTCH CONTROL FOR A ROTATION AND RECIPROCATION TRANSMISSION

This invention relates to a clutch control for rotation and reciprocation transmissions, such as those used in the garment knitting industry.

BACKGROUND OF THE INVENTION

The garment knitting industry utilizes knitting machines which have a shaft which alternately rotates and reciprocates about its longitudinal axis. That is, in some knitting processes, it is required that the shaft rotate continuously in one direction; while in other knitting processes, it is required that the same shaft reciprocate, about its longitudinal axis, to rotate in one direction and then in the other direction, and repeat the process. Of course it is desirable that the rotation and reciprocation mentioned are performed at high speeds and without any significant time interval between them. Further, the knitting machine has one power input which is constantly driving, and there is therefore a clutch member which moves between the drive for the rotation motion and a drive for the reciprocation motion. This clutch action is achieved by means of a clutch shifter which is under the influence of a compression spring and an air supply, both operative in opposite directions to achieve the clutch shifting mentioned.

The present invention provides a control for the clutch, such that the shifting between the rotation and the reciprocation can be accomplished in a rapid fashion and with a minimum of impact and disturbance to the elements involved.

This invention utilizes two yielding forces which operate on a clutch shifter and it produces a consequent smooth transition from rotating the shaft to reciprocating the shaft, particularly for the use in a knitting machine. One occasion for alternating between rotation and reciprocation is in the knitting of men's socks, where the heel portion is knitted with a reciprocating motion, and other portions of the sock are knitted with a rotation motion.

An object of this invention is to provide a control for a clutch in a machine operating alternately between rotation and reciprocation, and wherein the moving parts are intermeshed in the shift action while moving at the same speed and in the same direction of rotation. This objective is accomplished by elements which control the clutch itself so that the shifting is accomplished with the aforementioned features and in a convenient and practical manner.

BRIEF DESCRIPTION OF THE DRAWINGS

FIG. 3 is a front view of portions of the machine shown in FIG. 1, and showing the clutch control superimposed thereon.

FIG. 4 is a view of the clutch control elements shown in FIG. 2, from the side opposite thereof.

FIG. 5 is an end view of one element of FIG. 4.

FIG. 6 is a graph showing the element speeds and interconnections points.

DETAILED DESCRIPTION OF THE PREFERRED EMBODIMENT

Figure 1:
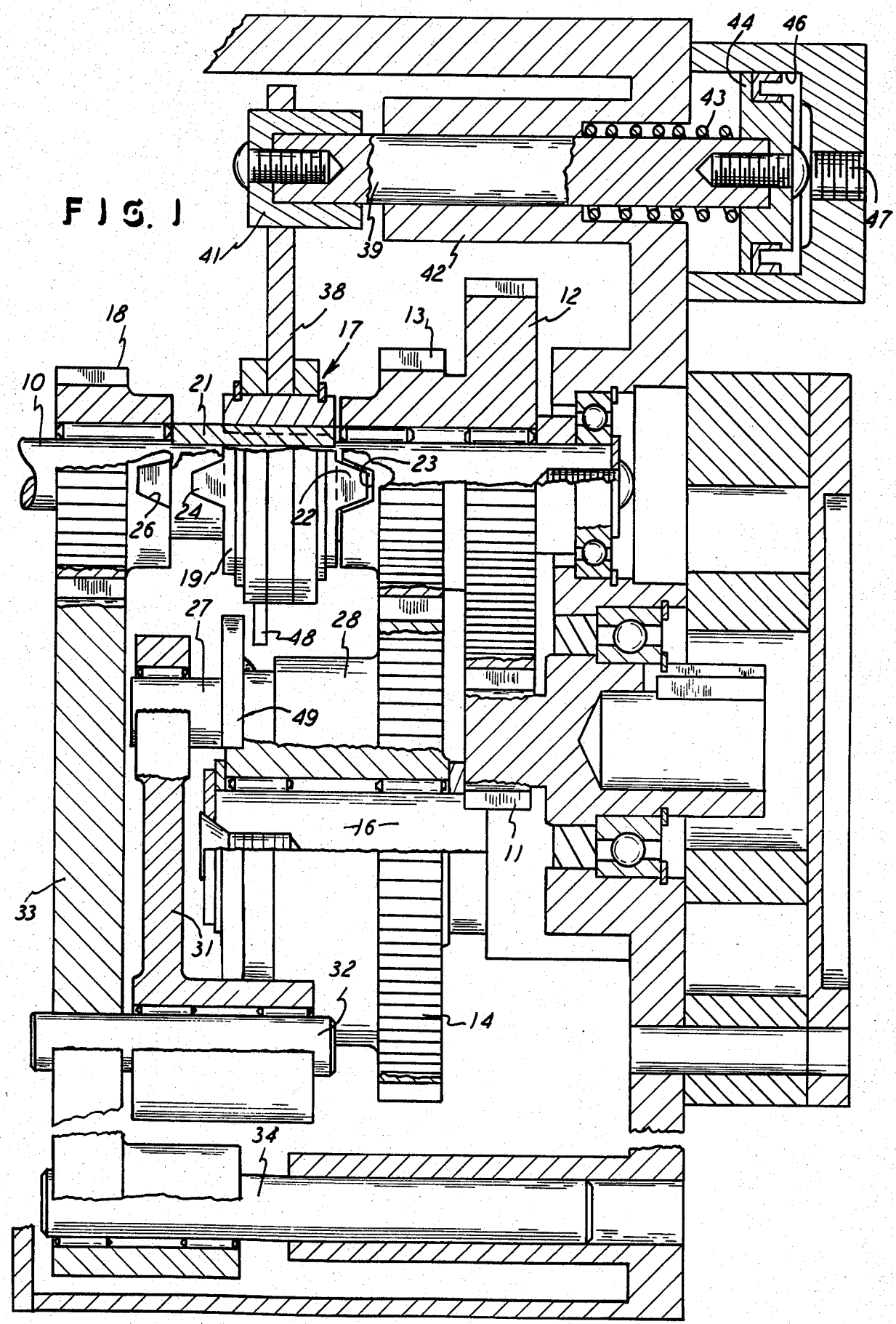
FIG. 1 is a sectional view of a knitting machine incorporating the control of this invention.

FIG. 1 generally shows a garment knitting machine transmission wherein an output shaft 10 is powered by the various gears and an unshown power input supply which would connect to the input pinion 11. The pinion 11 drives a gear 12 which has a gear 13 affixed thereto and which drives a gear 14 rotatably mounted on a fixed shaft 16, as shown. That standard transmission and gear train thus actuates the output shaft 10, through a clutch 17 interposed between the input gears mentioned and the output shaft 10, as indicated. The gears 12 and 13 are shown to be rotatable on the shaft 10, and also a gear 18 is rotatably mounted on the shaft 10, and that gear actually reciprocates by rotating in one direction and then in another direction about the longitudinal axis of the shaft 10, in a manner hereinafter described. The clutch 17 includes the clutch member 19 which moves longitudinally of the axis of the shaft 10, from the righthand position shown in FIG. 1 and to the left, such as shown in FIG. 3. The clutch member 19 is suitably splined or keyed to the shaft 10, such as by means of a key 21 on which the clutch member can slide and through which the clutch member 19 induces movement to the shaft 10, either reciprocating or rotating movement.

As shown in FIG. 1, the clutch member 19 has a drive lug or tooth 22 extending to the right thereof, that is, parallel to the longitudinal axis of the shaft 10, and the lug 22 engages a slot 23 formed in the side of the gear 13. With that engagement between lug 22 and gear 13, the rotation of the gear 13 is transmitted directly to the clutch member 19 which in turn transmitts the rotation to the shaft 10, for the rotation knitting process mentioned. When the clutch member 19 is shifted to S the left, as viewed in FIG. 1, that is, to the position shown in FIG. 3, then the clutch member 19 is in the reciprocation mode by virtue of the reciprocating action of the pinion gear 18, and thus the shaft 10 would not be rotating but would be reciprocating about its longitudinal axis, as desired. Again, the clutch 19 has a lug 24 on the left side thereof, for engagement with the slot 26 in the side of the gear 18, for the drive connection from the gear 18 to the clutch member 19 and then to the shaft 10. It will be further noted that the clutch teeth or lugs 22 and 24 are tapered, and likewise the teeth slots 23 and 26 are correspondingly tapered but slightly larger in overall size, all for a smooth meshing in engagement and disengagement therebetween.

Figure 2:
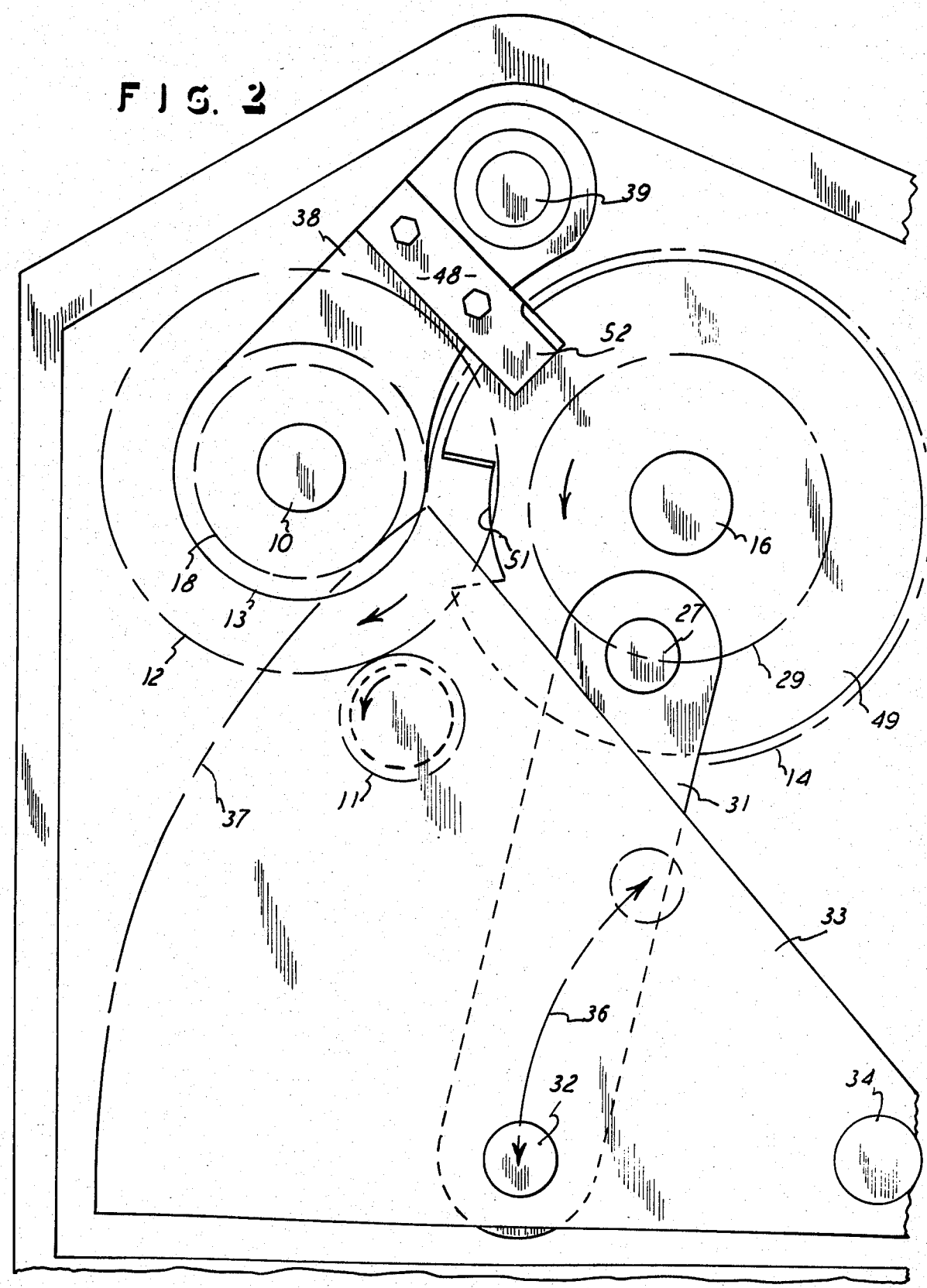
FIG. 2 is an end elevational view of FIG. 1.

To induce the reciprocating action, a pin 27 is connected with and extends laterally of the hub 28 of the gear 14 so that the pin 27 orbits the longitudinal axis of the mounting shaft 16, as shown by the dot-dash line 29 in FIG. 2. An arm 31 is mounted on the pin 27 and extends to a pin 32 which interconnects the arm 31 with a rack 33 through which the pin 32 passes. The rack 33 is mounted on a shaft 34 which is in a fixed position and presents the longitudinal axis for the reciprocating movement of the rack 33, and that reciprocation occurs upon the orbital movement of the pin 27 and the displacement of the arm 31 and the consequent reciprocating displacement of the rack 33 while the pin 32 moves between the two positions shown in FIG. 2 and along the dot-dash line designated 36.

The pin 27 and arm 31 thus form a crank which actuates the gear rack 33 which would have gear teeth as designated by the dot-dash line 37. The teeth 37 engage the teeth on the pinion gear 18, and thus the reciprocating action of the gear 18 about the longitudinal axis of the shaft 10 is created. It will therefore be clearly seen that when the clutch member 19 is shifted to the left, as viewed in FIG. 3, then the reciprocating action of the gear 18 is transmitted to the clutch member 19 which in turn transmits the reciprocation to the shaft 10 for the knitting action which occurs on the output or left-hand end of the shaft 10, and that portion of shaft 10 is also standard and the actual knitting action is not further shown nor need be shown for one skilled in the art.

A clutch shifter, in the form of an arm 38, is connected with the clutch element 19 and extends radially therefrom and is engaged with a shaft 39 by means of a connecting fork 41. The shaft 39 is mounted in the transmission frame 42 to be free to slide longitudinally of the axis of the shaft 39, that is, to the left and the right, as viewed in FIG. 1. A compression spring 43 abuts a piston 44 attached to the end of the shaft 39 and disposed in a piston cylinder 46. An air inlet opening 47 permits air to reach the piston 44 and displace it and the shaft 39 to the left, as viewed in FIG. 1, and thus shift the clutch member 19 into engagement with the gear 18. When there is no air forcing on the piston 44, then the spring 43 will push the piston 44 and its shaft 39 to the right, as viewed in FIG. 1, and thus produce the engagement of the clutch member 19 with the gear 13, and that is the normal mode of operation, that is, when the air pressure is off at 47. Of course the air pressure at 47 and the spring 43 are both yieldable forces acting on the clutch member 19, as described.

To provide for positive and smooth clutch action, with a minimum of elements and the maximum of safety and efficiency, a clutch gate, in the form of a projection or finger 48 and a disc or blocker 49 are utilized. The finger 48 is affixed to the plate or arm 38, as best shown in FIG. 2, and the disc 49 is suitably affixed to the hub 28 of the gear 14, as shown in FIGS. 1 and 2. FIG. 4 also shows the disc 49 has an opening 50 for receiving the crank pin 27 and thus accomodating the mounting of the disc 49. The radial portion of the disc 49 and the extended portion of the finger 48 are in an interference or overlapping position, as shown. FIG. 1 actually shows a diagrammatic position for the finger 48, to more clearly relate it to the disc 49 and for understanding of the construction. That is, FIG. 1 is not a section taken on one plane but is angulated, and the parts are actually in the positions shown in FIG. 2.

It will therefore be seen and understood that when the shifter 38 endeavors to move the clutch element 19 to the left or right, the finger 48 must negotiate the blocker or disc 49. That is accomplished by virtue of an opening or cut-out 51 in the circumference of the disc 49, and that opening is of a depth and length sufficient to have the projecting end 52 of the finger 48 pass through the opening 51 when the two are in register, such as shown in FIG. 4. In that aligned or registered position, the shifter 38 can move the clutch element 19 to the left and right, as desired. That provides for engagement of the lugs 22 and 24 only when the openings 23 and 26 are respectively ready to receive those lugs, that is when they are in aligned position and thus there can be a smooth shifting motion with a minimum of wear and tear on the elements and with immediate response to the clutching. That means that the gate itself, that is the clutch elements 48 and 49, are arranged to be synchronous with the engagement of the clutch element 19 with its driving pinions 13 and 18, as mentioned. FIG. 6 depicts the ultimate in the synchronization achieved and mentioned. For each two revolutions of the pinion 13, the pinion 18 makes a complete cycle or one revolution clockwise and one revolution counterclockwise. Since the pinion 18 is driven by a crank action, its speed varies from zero to a maximum which is considerably in excess of the speed of the rotating pinion 13. To insure a smooth and precise shift from rotation to reciprocation, and vice-versa, the shift must be made at the instant the pinions are rotating at the same speed and in the same direction. FIG. 6 shows a sine wave type of line 53 plotting the reciprocating pinion RPM from zero and starting upward, and the figure also shows the straight line 54 plotting the speed of the rotating pinion 13, and that speed is constant and can be considered to be clockwise, as marked. The gate of this invention is therefore arranged to provide that the clutch engagement or shift points, designated 56 and 57 are at the same speed and in the same clockwise direction when the lug or clutch members are being engaged, all as desired. The blocker plate or disc 49 rotates at ½ the speed of the pinion 13, so with the opening 51 located at a specific position on the circumference of the plate 49, it provides a positive means of timing the shift to the exact proper instant that it should occur, as mentioned.

FIG. 4 also shows that the height of the finger 48 is only approximately ½ of the total height of the opening 51, and this provides for lead space so that there is lead time or a head start for the finger 52 to pass through the blocker window or opening 51. Because of the rotational speeds involved, the finger 48 must pass through the opening 51 in a minimum of time. Also, the finger has a taper 58, and the disc 49 also has a matching taper 59, and the two tapers face each other, as shown in FIG. 4, so that the rotation of the disc 49 will cause the two tapers to engage and thus permit the disc 49 to rotate easily past the finger 48 without any hangup.

Since the forces created by the spring 43 and the air pressure on the piston 46 are yieldable forces, the finger 48 can actually be pressed against the side of the disc 49, if necessary, for a moment before the finger 48 passes through the window 51.

There is therefore provided the two drive members 13 and 18 and the clutch member 19 inbetween to transmit rotation and reciprocation to the shaft 10. The finger 48 and disc 49 provide the gate for controlling the clutch shifting, as mentioned, and are actually in the path of the clutch shifter 38, for the control mentioned.

What is claimed is:

1. In a clutch control for a rotation and reciprocation transmission having a rotating and reciprocating output shaft, two drive members operatively connected with said shaft for respective rotation and reciprocation operation of said shaft, a clutch member operatively interposed and movable between said drive members for alternate drive connection with said drive members and being drivingly connected with said shaft to alternately transmit rotation and reciprocation to said shaft in accordance with the operation of said drive members, a yieldably urged movable clutch shifter operatively connected with said clutch member between its positions of drive connection with said drive members, the improvement comprising a gate operatively interposed between one of said two drive members and said clutch shifter and disposed in the path of said clutch shifter to alternately release and restrain said clutch shifter relative to said clutch shifter movement of shifting said clutch member toward one of said two drive members.

2. The clutch control as claimed in claim 1, wherein said gate includes a rotating member mounted relative to said drive members and is synchronously rotatable relative to one of said drive members, and said gate including a member connected with said clutch member for movement therewith, and said gate members being mated relative to each other for controlling the movement of said clutch member between said drive members.

3. The clutch control as claimed in claim 2, including two sources of oppositely acting yielding forces operatively connected to said clutch member for inducing the shifting movement of said clutch member.

4. The clutch control as claimed in claim 1, wherein said gate includes a rotating disc mounted relative to said drive members and being synchronously rotatable relative to one of said drive members, said disc having an opening therein, and said gate including a finger connected with said clutch member for movement therewith and extending to said disc for preventing shifting movement of said clutch member, said finger being of a size less than that of said opening for passing through said opening when said disc is rotated, for shifting movement of said clutch member.

5. The clutch control as claimed in claim 4, including two sources of oppositely acting yielding forces operatively connected to said clutch member for inducing the shifting movement of said clutch member.

6. The clutch control as claimed in claim 1, wherein said drive members and said clutch members include interlocking rotation drivers for transmitting rotation from said drive members to said clutch member.

7. The clutch control as claimed in claim 2, wherein said drive members and said clutch members include interlocking rotation drivers for transmitting rotation from said drive members to said clutch member.

8. The clutch control as claimed in claim 7, wherein said gate members are predeterminely located relative to each other, and the mating of said gate members relative to each other is synchronized relative to the interlocking of said rotation drivers, for a smooth clutching action.

9. In a clutch control for a rotation and reciprocation transmission having a rotating and reciprocating output shaft, two drive members operatively connected with said shaft for respective rotation and reciprocation operation of said shaft, a clutch member operatively interposed and movable between said drive members for alternate drive connection with said drive members and being drivingly connected with said shaft to alternately transmit rotation and reciprocation to said shaft in accordance with the operation of said drive members, a yieldably urged movable clutch shifter operatively connected with said clutch member between its positions of drive connection with said drive members, the improvement comprising a rotating disc mounted adjacent said clutch member and having an opening therein, a finger connected with said clutch shifter and extending to said disc, said finger being of a size to move into said disc opening and to do so when said disc opening is rotated to a position adjacent said finger, whereby said disc controls the shifting movement of said clutch member.

10. The clutch control as claimed in claim 9, including two sources of oppositely acting yielding forces operatively connected to said clutch member for inducing the shifting movement of said clutch member.

11. The clutch control as claimed in claim 10, wherein said drive members and said clutch members include interlocking rotation drivers for transmitting rotation from said drive members to said clutch member.

* * * * *